3,009,937
Patented Nov. 21, 1961

3,009,937
2-METHYL-1 DEHYDRO HYDROCORTISONE, 21-ESTERS AND 11-KETO ANALOGUES THEREOF
John A. Hogg, Kalamazoo Township, Kalamazoo County, and Frank H. Lincoln, Jr., Kalamazoo, Mich., assignors to The Upjohn Company, Kalamazoo, Mich., a corporation of Michigan
No Drawing. Filed Jan. 17, 1957, Ser. No. 634,616
8 Claims. (Cl. 260—397.45)

This invention relates to novel steroids and, more particularly, to novel synthetic steroid compounds and novel steroid intermediates in the production thereof.

The novel compounds of the present invention and the processes for their production may be represented as follows:

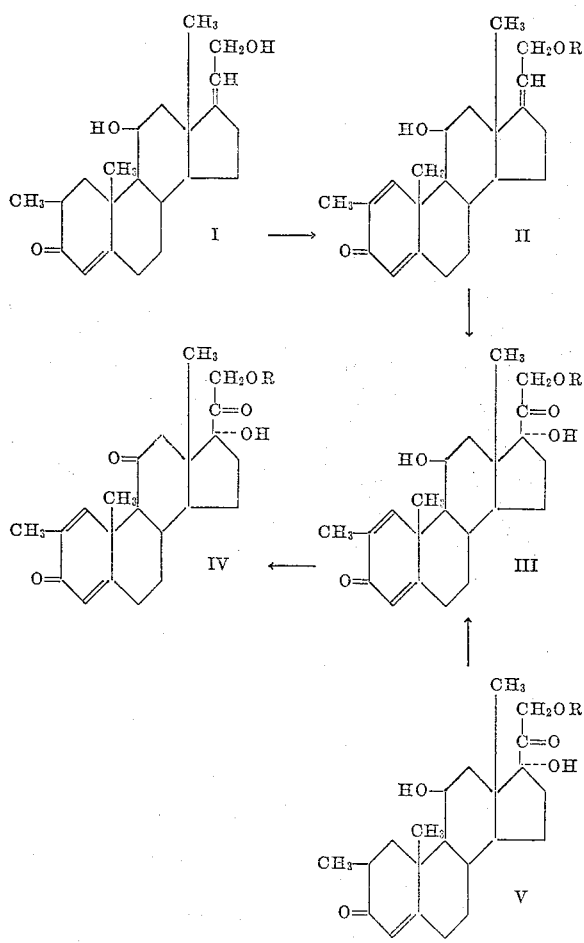

It is an object of the present invention to provide novel synthetic steroid compounds. Another object is the provision of steroid intermediates readily convertible to these steroid compounds. Other objects will be apparent to those skilled in the art to which this invention pertains from the more detailed description which follows.

According to the present invention, 2-methyl-11β,21-dihydroxy - 1,4,17(20) - pregnatrien-3-one and 21-esters thereof (II) are prepared from 2-methyl-11β,21-dihydroxy,4,17(20)-pregnadien-3-one or its 21-esters (I) by subjection of the latter compound to the fermentative action of a fungus of the genus Septomyxa, preferably *Septomyxa affinis*, more completely described as *Septomyxa affinis* (Sherb.) Wr., American Type Culture Collection 6737, a member of the class of Deuteromyces, fungi imperfecti. The 1,4-dehydrogenated compounds thus produced are useful intermediates in the preparation of 2-methyl-1-dehydrohydrocortisone and its 21-esters (III). Thus, 2-methyl-11β-hydroxy-21-acyloxy - 1,4,17-(20)-pregnatrien-3-one (II) is oxidatively hydroxylated with a metal oxide and an oxidizing agent to yield the corresponding 2-methyl-1 - dehydrohydrocortisone esters (III). Osmium tetroxide is the metal oxide of choice in this reaction, and hydrogen peroxide, the aryl iodoso acetates, and the tertiary amino oxide peroxides are most effective as oxidizing agents. Since it is preferred in the oxidative hydroxylation step that the starting steroid be a 21-acyloxy steroid, a 2-methyl-11β,21-dihydroxy - 1,4,17-(20)-pregnatrien-3-one is first esterified by methods known in the art, e.g., by reaction with the desired acid anhydride or acid chloride, preferably in the presence of pyridine, alkyl pyridine or other N-cycloaromatic tertiary amine, or wtih free acid, such as formic acid or a weaker acid in the presence of an esterification catalyst, e.g., paratoluenesulfonic acid or sulfuric acid, or with an ester by ester interchange reaction, or by reaction with the ketene of the selected acid. The resulting 21-ester, preferably the acetate, is then subjected to oxidative hydroxylation as described to produce the 2-methyl-1-dehydrohydrocortisone 21-ester (III), most commonly the acetate. Where 2-methyl-1-dehydrohydrocortisone is desired, the 2-methyl-1-dehydrohydrocortisone 21-ester is hydrolyzed by conventional procedures heretofore applied to the hydrolysis of compound "F" acetate to "F" alcohol, such as treatment with dilute acid, e.g., sulfuric acid.

The starting 2-methyl-11β,21-dihydroxy - 4,17(20)-pregnadien-3-one or 21-esters thereof (I) is prepared from the known 11β,21-dihydroxy-4,17(20)-pregnadien-3-one according to the method of Lincoln et al. as described in copending application Serial No. 485,318, filed January 31, 1955. In this procedure, the 11β,21-dihydroxy-4,17-(20)-pregnadien-3-one or 21-esters thereof is reacted with methyl oxalate and sodium methoxide in methanol followed by hydrochloric acid to produce 2-methoxyoxalyl-11β,21-dihydroxy-4,17(20) - pregnadien-3-one or its 21-esters, which is then treated with anhydrous potassium carbonate and methyl iodide in acetone to yield 2-methyl-2-methoxyoxalyl-11β,21-dihydroxy-4,17(20)-pregnadien-3-one or its 21-esters. Reaction of this compound with sodium methoxide in methanol yields the desired 2-methyl-11β,21-dihydroxy-4,17(20)-pregnadien-3-one or 21-esters thereof (I).

The 2-methyl-1-dehydrohydrocortisone or its 21-esters (III) can also be prepared by dehydrogenation of 2-methylhydrocortisone or its 21-esters (V) by the aforementioned fermenative action of *Septomyxa affinis*. Introduction of the $\Delta^1$-double bond occurs in the same manner as was demonstrated in the fermentative conversion to the $\Delta^{1,4}$-configuration of 2-methyl-11β,21-dihydroxy-4,17(20)-pregnadien-3-one and 21-esters thereof (I). It is therefore seen that the particular sequence of reactions of oxidative hydroxylation and fermentative dehydrogenation is immaterial in producing the compounds of the present invention. The starting 2-methylhydrocortisone 21-ester is prepared from the corresponding 2-methyl-11β-hydroxy-21-acyloxy-4,17(20) - pregnadien-3-one (I) by oxidative hydroxylation with a metal oxide and an oxidizing agent as later described. Hydrolysis of the thus produced 21-ester of 2-methylhydrocortisone, for example, with aqueous potassium bicarbonate solution in a nitrogen atmosphere, yields the 2-methylhydrocortisone.

The 2-methyl-1-dehydrohydrocortisone and its 21-acetate (III) have demonstrated remarkable and unexpected activity several times that of hydrocortisone in facilitating glycogen deposition. In addition, they have been shown to be substantially more effective than desoxycorticosterone acetate in reducing losses of sodium chloride in treatment of adrenocortical insufficiency as well as possessing an unusually high anti-inflammatory activity. In particular, these compounds find application in the treatment of Addison's disease, rheumatoid arthritis, and inflammatory conditions of the skin, inner ear, nose and eye. Similar activities are attributable to the 2-methyl-1-dehydrocortisone and its 21-acetate (IV), the former being obtained by conventional oxidation, for example, with sodium dichromate in acid, of 2-methyl-1-dehydrohydrocortisone acetate (III). As indicated previously, the novel 2-methyl-11β,21-dihydroxy-1,4,17(20)-pregnatrien-3-one and its 21-esters (II) are useful intermediates in the preparation of the above described 2-methyl-1-dehydrohydrocortisone, 2-methyl-1-dehydrocortisone, and 21-esters thereof (III, IV).

The following preparations and examples are illustrative of the processes and products of the present invention but are not to be construed as limiting.

PREPARATION 1

2 - methoxyoxalyl - 11β,21 - dihydroxy - 4,17(20)-pregnadien-3-one

A solution of eighteen grams (0.05 mole) of 11β,21-dihydroxy-4,17(20)-pregnadien-3-one was prepared in 300 milliliters of dry tertiary butyl alcohol by heating the mixture at seventy degrees centigrade. The solution was cooled to 55 degrees centigrade and to the stirred solution, protected from atmospheric oxygen by bubbling nitrogen therethrough, was added 11.5 grams (0.10 mole) of methyl oxalate followed by a solution of 4.05 grams (0.075 mole) of sodium methoxide dissolved in sixteen milliliters of methanol. A thick, pale yellow precipitate soon appeared. Stirring was continued for ten minutes and the mixture was then diluted with 300 milliliters of anhydrous ether. Stirring was continued for an additional fifteen minutes and the mixture then filtered. The pale yellow-green precipitate was washed and dried at room temperature under vacuum. The yield of about 24 grams of precipitate consisting primarily of the sodium enolate of 2-methoxyoxalyl-11β,21-dihydroxy-4,17(20)-pregnadien-3-one.

Following the procedure described, the sodium enolate of other 2 - methoxyoxalyl - 11β - hydroxy - 21 - acyloxy-4,17(20)-pregnadien-3-one are prepared by substituting the corresponding 21-ester of 11β,21-dihydroxy-4,17(20)-pregnadien-3-one as the starting steroid of the reaction described in Preparation 1. Examples of the sodium enolate of 2 - methoxyoxalyl - 11β - hydroxy - 21 - acyloxy-4,17(20)-pregnadien-3-ones thus prepared include those wherein the acyl group is the acyl radical of a hydrocarbon carboxylic acid containing from one to twelve carbon atoms, inclusive, preferably a lower-aliphatic acid containing from one to eight carbon atoms, inclusive, e.g., formic, propionic, butyric, isobutyric, valeric, isovaleric, trimethylacetic, hexanoic, diethylacetic, triethylacetic, octanoic, or other aryl, alkaryl, aralkyl or cycloalkyl, acids, e.g., benzoic, naphthoic, phenylacetic, 2,4,6-triethylbenzoic, cyclopentyl-formic, etc.

The precipitate consisting primarily of the sodium enolate of 2 - methoxyoxalyl - 11β,21 - dihydroxy - 4,17(20)-pregnadien-3-one obtained by the method of Preparation 1 was dissolved in 250 milliliters of water and the solution acidified with dilute hydrochloric acid. The resulting precipitate was collected by filtration, washed with water and dried. There was thus obtained about eighteen grams of an amorphous powder consisting essentially of 2 - methoxyoxalyl - 11β,21 - dihydroxy - 4,17(20)-pregnadien-3-one, which melted at eighty to 95 degrees centigrade and which gave a positive red-brown ferric chloride test.

PREPARATION 2

2-methyl-2-methoxyoxalyl-11β,21-dihydroxy-4,17(20)-pregnadien-3-one

A mixture of 4.50 grams of crude 2-methoxyoxalyl-11β,21 - dihydroxy - 4,17(20) - pregnadien - 3- one, obtained according to the method of Preparation 1, ten grams of anhydrous potassium carbonate, fifteen milliliters of methyl iodide and 100 milliliters of acetone were stirred at about 25 degrees centigrade for forty hours. Water was then added and the mixture extracted thoroughly with methylene chloride. The extract was washed with water, dried and the solvent distilled to leave a glassy residue consisting essentially of 2-methyl-2-methoxyoxalyl-11β,21-dihydroxy-4,17(30)-prenadien-3-one.

Similarly, substituting the corresponding 21-ester of 2-methoxyoxalyl - 11β,21 - dihydroxy - 4,17(20)-pregnadien-3-one for the starting material above is productive of 2 - methyl - 2 - methoxyoxalyl - 11β - hydroxy - 21-acyloxy - 4,17(20) - pregnadien - 3 - ones. Examples of the latter compounds thus prepared include those wherein the acyl group is the acyl radical of a hydrocarbon carboxylic acid containing from one to twelve carbon atoms, inclusive, preferably a lower aliphatic acid containing from one to eight carbon atoms, inclusive, e.g., formic, propionic, butyric, isobutyric, valeric, isovaleric, trimethylacetic, hexanoic, diethylacetic, triethylacetic, octanoic, or other aryl, alkaryl, aralkyl or cycloalkyl, acids, e.g., benzoic, napthoic, phenylacetic, 2,4,6-triethylbenzoic, cyclopentylformic, etc.

PREPARATION 3

2-methyl-11β,21-dihydroxy-4,17(20)-pregnadien-3-one (I)

The glassy residue of crude 2-methyl-2-methoxyoxalyl-11β,21 - dihydroxy - 4,17(20) - pregnadien - 3 - one, obtained according to the method described in Preparation 2, was dissolved in fifty milliliters of methanol to which was then added three milliliters of a 25 percent solution of sodium methoxide in methanol. The now red solution was stirred for two hours at about 25 degrees centigrade. The mixture was then diluted with about 200 milliliters of water and extracted thoroughly with methylene chloride. The combined methylene chloride extracts were washed with water, dried and the solvent then distilled therefrom, leaving a steroidal residue consisting essentially of 2-methyl-11β,21-dihydroxy-4,17(20)-pregnadien-3-one. The thus-produced 2-methyl-11β,21-dihydroxy - 4,17(20) - pregnadien - 3 - one was purified by chromatography over Florisil magnesium silicate developed with Skellysolve B hexane hydrocarbons containing increasing amounts of acetone.

Similarly, substituting the corresponding 21-ester of 2 - methyl - 2 - methoxyoxalyl - 11β,21 - dihydroxy - 4, 17(20)-pregnadien-3-one for the starting material above is productive of 2-methyl-11β-hydroxy-21-acyloxy-4,17 (20)-pregnadien-3-ones. Examples of the latter compounds thus prepared include those wherein the acyl group is the acyl radical of a hydrocarbon carboxylic acid containing from one to twelve carbon atoms, inclusive, preferably a lower aliphatic acid containing from one to eight carbon atoms, inclusive, e.g., formic, propionic, butyric, isobutyric, valeric, isovaleric, trimethylacetic, hexanoic, diethylacetic, triethylacetic, octanoic, or other aryl, alkaryl, aralkyl or cycloalkyl, acids, e.g., benzoic, naphthoic, phenylacetic, 2,4,6-triethylbenzoic, cyclopentylformic, etc.

PREPARATION 4

2-methylhydrocortisone acetate (V)

To a solution of 1.40 grams (3.63 millimoles) of 2-methyl-11β-hydroxy-21-acetoxy - 4,17(20) - pregnadien-3-one, prepared as described in Preparation 3, in seventy milliliters of dry tertiary butyl alcohol was added at room temperature nine milliliters of dry pyridine, 5.8 milliliters of dry tertiary butyl alcohol solution containing 1.37 grams (9.1 millimoles) of N-methylmorpholine oxide peroxide, and ten milligrams of osmium tetroxide, in that order. The resulting solution was stirred at between 25 and 30 degrees centigrade for eighteen hours. There was then added 150 milliliters of water to the mixture which was then extracted thoroughly with methylene chloride, the methylene chloride solution washed with water, cold dilute hydrochloric acid, cold aqueous sodium bicarbonate, water and then dried. The solvent was distilled from the dried solution at reduced pressure. The crude residue was dissolved in methylene chloride and poured over a column of 110 grams of Florisil magnesium silicate. The column was developed with 175-milliliter portions of solvent of the following composition and order: eight of Skellysolve B hexane hydrocarbons plus ten percent acetone, seven of Skellysolve B plus twelve percent acetone, two of Skellysolve B plus fifteen percent acetone, and one of acetone. The Skellysolve B plus five percent acetone eluted 331 milligrams of starting steroid. The Skellysolve B plus twelve percent acetone eluted 784 milligrams, a yield of 69 percent calculated on the starting steroid which reacted, of 2-methylhydrocortisone acetate (V) which, after crystallization from ether, melted at 133 to 135 degrees centigrade, had an $[\alpha]_D$ of plus 158 degrees in chloroform and the analysis is below.

Calculated for $C_{24}H_{34}O_6$: C, 68.87; H, 8.19. Found: C, 68.38; H, 8.52.

Subsequent preparations of 2-methylhydrocortisone acetate gave crystals melting at 171 to 171.5 when crystallized from a mixture of ethyl acetate and Skellysolve B, having an $[\alpha]_D$ of plus 164 degrees, an $E_{242}$ of 15,125, the same papergram and infrared spectrum analysis as the product of the previous preparation, and a carbon-hydrogen analysis almost identical to the calculated.

Similarly, other 2-methyl-11β-hydroxy-21-acyloxy-4,17(20)-pregnadien-3-ones are similarly converted to the corresponding 2 - methyl - 11β,17α - dihydroxy-21-acyloxy-4-pregnene 3,20-diones wherein the acyl group is the acyl radical of, for example, a lower-aliphatic acid, e.g., formic, propionic, butyric, isobutyric, valeric, isovaleric, trimethylacacetic, 2-methylbutyric, 3-ethylbutyric, hexanoic, diethylacetic, triethylacetic, heptanoic, octanoic, the optically active abietic, α-ethylisovaleric, an acylic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid, (which can be converted to water soluble, e.g., sodium, salts) e.g., succinic, glutaric, α-methylglutaric, β-methylglutaric, β,β-dimethylglutaric, adipic, pimelic, suberic, a hydroxyacid, e.g., glycolic, lactic, citric, tartaric, d-malic, d-glyceric, mannonic, gluconic, salicyclic, an aminoacid, e.g., glycine, diglycollamic, triglycollamic, methylglycine, dimethylglycine, diethylglycine, para-aminosalicyclic, para-aminobenzoic, other hetero-substituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl - 2 - carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

EXAMPLE 1

2-methyl-11β,21-dihydroxy-1,4,17(20)-pregnatrien-3-one (II)

Three 100-milliliter portions of glucose-corn steep liquor medium having pH of 4.6 were inoculated with Septomyxa affinis and incubated in shaken flasks at room temperature for 48 hours. During this period a heavy fungal growth developed. Six liters of the same medium, to which was added five milliliters of lard oil containing 0.1 percent octadecanol as defoamer, was inoculated with the combined volume of 300 milliliters of medium containing the fungal growth. Incubation of the resulting mixture was conducted at 28 degrees centigrade with constant agitation and aeration (one liter of air per six liters of beer). At the end of 24 hours, 470 milligrams of 2-methyl-11β,21-dihydroxy-4,17(20)-pregnadien-3-one dissolved in sixty milliliters of propylene glycol was slowly added to the mycelium and fermentation of the steroid continued for three days, at which time the pH was 7.7. The beer was then divided into two equal portions, and each portion was extracted independently with four 350-milliliter volumes of chloroform under reflux for one to three hours. The extracts were combined, cooled, evaporated to dryness, and the residue dissolved in 47 milliliters of chloroform. A one-milliliter sample was subjected to paper chromatographic analysis, from which it was determined that a total recovery of 28 percent of unknown material had been obtained.

Purification of 1.94 grams of material obtained as indicated above by the action of Septomyxa affinis on the 2-methyl-11β,21-dihydroxy-4,17(20)-pregnadien-3-one consisted first of extracting the material with hot chloroform and dissolving the same in 100 milliliters of ethylene dichloride. The resulting solution was separated chromatographically in a column containing 68 grams of Florisil magnesium silicate. The material was then eluted in 112-milliliter portions of the following mixtures:

| Fractions | Solvent |
|---|---|
| 1 and 2 | ethylene dichloride. |
| 3 and 4 | ethylene dichloride-acetone (25:1). |
| 5 and 6 | ethylene dichloride-acetone (15:1). |
| 7 and 8 | ethylene dichloride-acetone (12:1). |
| 9 and 10 | ethylene dichloride-acetone (10:1). |
| 11 and 12 | ethylene dichloride-acetone (8:1). |
| 13 and 14 | ethylene dichloride-acetone (5:1). |
| 15 and 16 | ethylene dichloride-acetone (3:1). |
| 17 and 18 | ethylene dichloride-acetone (1:1). |
| 19 and 20 | acetone. |

Fractions 7 through 11, representing a combined weight of 315.4 milligrams, contained most of the bioconversion product. The dry residue contained no crystals, and no material was crystallizable from acetone and ethyl acetate. Spectrographic study of a 44-milligram sample of the dry residue confirmed the presence of 2-methyl-11β,21-dihydroxy-1,4,17(20)-pregnatrien-3-one, as well as a high ratio of bioconversion product to 2-methyl-11β,21-dihydroxy-4,17(20)-pregnadien-3-one.

EXAMPLE 2

2-methyl-11β-21-acetoxy-1,4,17(20)-pregnatrien-3-one (II)

From fractions 7 through 11 of the chromatographic separation description in Example 1 above, 231.9 milligrams of material was acetylated with glacial acetic acid and acetic anhydride and the product precipitated from the reaction mixture by ice water. After filtration through fine sintered glass, the residue was washed several times with five percent hydrochloric acid and then with water. The residue was dissolved in methylene chloride and acetone and evaporated to dryness in an air stream to give 203.7 milligrams of material having a melting point of 190 to 205 degrees centigrade. This material was dried in a vacuum oven at 75 degrees centigrade for two hours. It was then dissolved in ethyl acetate and the resulting solution concentrated to give 135.5 milligrams of crystals having a melting point of 204 to 206.5 degrees centigrade. Recrystallization from ethyl acetate yielded 85.1 milligrams of crystals melting at 207 to 210 degrees centigrade and having the following properties:

$[\alpha]_D^{25}$ of plus 95 degrees (chloroform);

$\lambda_{max.}^{ethanol}$ 249mμ; E=16,600; ratio $\frac{A249}{A269.5}$=254

Infrared spectrum analysis indicated absorption as follows: —OH, 3350 centimeters$^{-1}$; acetate C=O, 1732 centimeters$^{-1}$; conjugated ketone, 1664 centimeters$^{-1}$; conjugated C=C, 1610, 1575 centimeters$^{-1}$; ester C—O, 1220 centimeters$^{-1}$; finger-print and alcohol C—O bands, 1160, 1015, 950, 922, 784 centimeters$^{-1}$. Both ultraviolet and infrared absorption data agreed with the structure as represented by 2-methyl-11β-hydroxy-21-acetoxy-1,4,17(20)-pregnatrien-3-one (III).

Calculated for $C_{24}H_{32}O_4$: C, 74.97; H, 8.39. Found: C, 74.71; H, 8.69.

EXAMPLE 3

*2-methyl-1-dehydrohydrocortisone acetate (III)*

A solution of 4.96 grams (12.8 millimoles) of 2-methyl-11β-hydroxy-21-acetoxy-1,4,17(20)-pregnatrien-3-one in 250 milliliters of tertiary butyl alcohol was prepared by first heating the mixture and then cooling to room temperature. To this solution was added, with continuous stirring, 3.2-milliliters of pyridine, 17.2 milliliters of N-methylmorpholine oxide peroxide in tertiary butyl alcohol ($2.06 \times 10^{-3}$ moles per milliliter), and 25 milligrams osmium tetroxide. After eighteen hours, fifty milliliters of water was added and most of the tertiary butyl alcohol evaporated at reduced pressure. Thereafter, an additional 100 milliliters of water was added and the resulting mixture extracted with methylene chloride. The extract was washed with cold dilute hydrochloric acid until the wash remained acid, then with cold sodium bicarbonate solution and finally with water. The washed extract was then dried over sodium sulfate. Evaporation at reduced pressure left a glassy residue which was dissolved in 200 milliliters of methylene chloride and chromatographed on Florisil magnesium silicate. The column was eluted with the following:

| Fractions | Solvent |
| --- | --- |
| 1–4 | 7.5 percent acetone-Skellysolve B. |
| 5–8 | 10 percent acetone-Skellysolve B. |
| 9–18 | 15 percent acetone-Skellysolve B. |
| 19–23 | 20 percent acetone-Skellysolve B. |
| 24 | 100 percent acetone. |

Fractions 11 through 15 (eluted with fifteen percent acetone-Skellysolve B) were found to contain 2.95 grams, or 55.5 percent, of partly crystalline product. Recrystallization from ethyl acetate gave in the first crop 1.79 grams as prisms having a melting point of 202 to 204 degrees centigrade and in the second crop 0.62 gram as prisms melting at 197 to 200 degrees centigrade, these crops representing 45.3 percent recovery. A portion of the first crop was again recrystallized from ethyl acetate to give prisms having a melting point of 203 to 204 degrees centigrade and displaying the following properties:

$[\alpha]_D$ of plus 95 degrees (chloroform);

$\lambda_{max.}^{ethanol}$ 249 m$\mu$ $a_M = 16,175$. Analysis was as follows:

Calculated for $C_{24}H_{32}O_6$: C, 69.21; H, 7.75. Found: C, 68.88; H, 7.75.

Similarly, other 2-methyl-1-dehydrohydrocortisone 21-esters are prepared by substituting for the 2-methyl-11β-hydroxy-21-acetoxy-1,4,17(20)-pregnatrien-3-one above other corresponding 21-acyloxy compounds wherein the acyl radical is a group as described in Preparation 4.

EXAMPLE 4

*2-methyl-1-dehydrohydrocortisone (III)*

Six 100-milliliter shaker flasks were inoculated with *Septomyxa affinis* and cultured as described in Example 1. After incubation for twelve hours, two grams of 2-methylhydrocortisone (IV) and one gram of progesterone were added to the culture and fermentation allowed to proceed for two days, the final pH being 7.6. The beer was extracted with hot chloroform and evaporated to dryness. The residue was dissolved in 300 milliliters of methylene chloride and chromatographed over 440 grams of Florisil magnesium silicate. The material was then eluted to yield fractions as follows:

| Fractions | | Weight |
| --- | --- | --- |
| 1 | Methylene chloride | .046. |
| 2 | 15% Acetone-Skellysolve B | .006. |
| 4 | do | .289—oil. |
| 5 | do | .006. |
| 6 | do | .001. |
| 7 | do | .003. |
| 8 | do | .034. |
| 9 | do | .039. |
| 10 | 25% Acetone-Skellysolve B | .017. Crystalline Weight, 0.204 gram. |
| 11 | do | .062. |
| 12 | do | .062. |
| 13 | do | .040. |
| 14 | do | .020. |
| 15 | do | .007. |
| 16 | do | .011. |
| 17 | do | .010. |
| 18 | 40% Acetone-Skellysolve B | .002. Crystalline positive Tollens test. Weight, 2.341 grams. |
| 19 | do | .093. |
| 20 | do | .609. |
| 21 | do | .761. |
| 22 | do | .549. |
| 23 | do | .217. |
| 24 | do | .077. |
| 25 | do | .035. |
| 26 | 50% Acetone-Skellysolve B | .017. |
| 27 | do | .088. |
| 28 | do | .009. |
| 29 | do | .002. |
| 30 | Acetone | .001. |

Fractions 19 through 25 were combined and rechromatographed over 300 grams of Florisil magnesium silicate. The product, weighing 2.223 grams was eluted from the column with seven 300-milliliter portions of thirty percent acetone in Skellysolve B. This elution yielded the folloding fractions:

| Fractions | | Weight |
| --- | --- | --- |
| 1 | Methylene chloride | .018. |
| 2 | do | .000. |
| 3 | 30% Acetone-Skellysolve B | .010. |
| 4 | do | .015. |
| 5 | do | .187. |
| 6 | do | .380. |
| 7 | do | .733. Strong Tollens test. Weight, 2.223 grams. |
| 8 | do | .513. |
| 9 | do | .222. |
| 10 | do | .129. |
| 11 | 35% Acetone-Skellysolve B | .059. |
| 12 | do | .017. |
| 13–27 | Discarded | .000. |

Fractions 6 and 7 were triturated with methylene chloride to leave a crystalline residue weighing 0.154 grams. This in turn was triturated with acetone, giving a crystalline residue of 0.058 grams melting at 255 to 260 degrees centigrade and having an ultraviolet maximum of 247. Fraction 8 was triturated with acetone and filtered, yielding 0.057 grams of crystals melting at 265 to 269 degrees centigrade.

Seventy milligrams of combined crystals from these fractions were recrystallized from five milliliters of acetone to yield 0.037 gram of product having a melting point of 270 to 272 degrees centigrade. Both infrared and ultraviolet spectra were consistent with the 2-methyl-1-dehydrohydrocortisone structure. Gradient chromatography of the soluble residues provided no better separation than did straight chromatography. On analysis the following was obtained:

Calculated for $C_{22}H_{30}O_5$: C, 70.56; H, 8.08. Found: C, 70.80; H, 8.56.

EXAMPLE 5

*2-methyl-1-dehydrocortisone acetate (IV)*

To a solution of one gram of 2-methyl-1-dehydrohydrocortisone acetate in ten milliliters of acetic acid was added a solution of 0.90 grams of sodium dichromate in fifteen milliliters of acetic acid. External cooling was maintained during mixing. The mixture was kept at room temperature for one hour and then poured into 150 milliliters of ice water containing 0.5 gram of sodium sulfite. The product was washed with water and filtered dry to yield 0.96 gram of residue. This crude material was dissolved in methylene chloride and chromatographed over Florisil magnesium silicate and the column eluted as follows:

| Fractions | Solvent |
| --- | --- |
| 1-5 | 10 percent Acetone-Skellysolve B. |
| 6-10 | 12½ percent Acetone-Skellysolve B. |
| 11-14 | 15 percent Acetone-Skellysolve B. |
| 15 | 100 percent acetone. |

Fractions 8 through 12 contained 0.87 grams of crystals which on recrystallization from acetone-Skellysolve B yielded 0.61 gram of crystals as prisms having a melting point of 195 to 197 degrees centigrade and $[\alpha]_D$ of plus 177 degrees (chloroform). Analysis was as follows:

Calculated for $C_{24}H_{30}O_6$: C, 69.54; H, 7.30. Found: C, 69.29; H, 7.21.

Similarly, other 21-esters of 2-methyl-1-dehydrocortisone are prepared from the corresponding 21-esters of 2-methyl-1-dehydrohydrocortisone by substituting for the latter compound in the above reaction a 21-acyloxy-2-methyl-1-dehydrohydrocortisone wherein the acyl radical is a group as described in Preparation 4.

EXAMPLE 6

*2-methyl-1-dehydrocortisone (IV)*

A solution of one grams of 2-methyl-1-dehydrocortisone acetate in 200 milliliters of methanol was freed of dissolved air by bubbling nitrogen through it for ten minutes. To this solution was added a solution of 0.8 gram of potassium bicarbonate in eighty milliliters of water similarly freed of dissolved air. The resulting solution was stirred at room temperature in a nitrogen atmosphere for six hours, after which a solution of two milliliters of acetic acid in 120 milliliters of ice water was added. The mixture was concentrated at reduced pressure until precipitation of the product occurred. The mixture was refrigerated for four hours, the product filtered, washed with water, and dried under vacuum. The resulting crude 2-methyl-1-dehydrocortisone was purified by recrystallization from acetone.

This application is a continuation-in-part of application Serial No. 485,318 of Lincoln et al., filed January 31, 1955, now U.S. Patent 2,923,720.

It is to be understood that the invention heretofore described is not to be limited to the exact details of operation or exact compounds shown and described, as obvious modifications and equivalents will be apparent to one skilled in the art; the invention is therefore to be limited only by the scope of the appended claims.

I claim:

1. Compounds represented by the following formula:

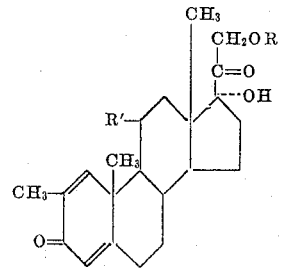

wherein R is a member selected from the group consisting of hydrogen and acyl radicals of hydrocarbon carboxylic acids containing from one to twelve carbon atoms, inclusive, and R' is a member selected from the group consisting of hydroxy and keto.

2. 2-methyl-1-dehydrohydrocortisone.
3. 2-methyl-1-dehydrohydrocortisone acetate.
4. 2-methyl-1-dehydrocortisone.
5. 2-methyl-1-dehydrocortisone acetate.
6. Compounds represented by the following formula:

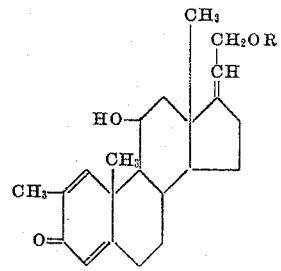

wherein R is a member selected from the group consisting of hydrogen and acyl radicals of hydrocarbon carboxylic acids containing from one to twelve carbon atoms, inclusive.

7. 2 - methyl - 11β,21 - dihydroxy - 1,4,17(20) - pregnatrien-3-one.

8. 2 - methyl - 11β - hydroxy - 21 - acetoxy - 1,4,17(20)-pregnatrien-3-one.

No references cited.